(12) United States Patent
Mendhekar

(10) Patent No.: US 10,015,506 B2
(45) Date of Patent: Jul. 3, 2018

(54) FREQUENCY REDUCTION AND RESTORATION SYSTEM AND METHOD IN VIDEO AND IMAGE COMPRESSION

(71) Applicant: Cinova Media, Mountain View, CA (US)

(72) Inventor: Anurag Mendhekar, Los Altos, CA (US)

(73) Assignee: CINOVA MEDIA, Mountain View, CA (US)

( * ) Notice: Subject to any disclaimer, the term of this patent is extended or adjusted under 35 U.S.C. 154(b) by 468 days.

(21) Appl. No.: 14/281,782

(22) Filed: May 19, 2014

(65) Prior Publication Data

US 2014/0341303 A1 Nov. 20, 2014

Related U.S. Application Data

(60) Provisional application No. 61/825,487, filed on May 20, 2013.

(51) Int. Cl.
| | |
|---|---|
| *H04N 19/48* | (2014.01) |
| *H04N 19/40* | (2014.01) |
| *H04N 19/12* | (2014.01) |
| *H04N 19/18* | (2014.01) |
| *H04N 19/154* | (2014.01) |
| *H04N 19/56* | (2014.01) |
| *H04N 19/563* | (2014.01) |
| *H04N 19/625* | (2014.01) |
| *H04N 19/50* | (2014.01) |
| *H04N 19/139* | (2014.01) |

(52) U.S. Cl.
CPC ............. *H04N 19/48* (2014.11); *H04N 19/12* (2014.11); *H04N 19/154* (2014.11); *H04N 19/18* (2014.11); *H04N 19/40* (2014.11); *H04N 19/625* (2014.11)

(58) Field of Classification Search
CPC .... H04N 19/40; H04N 19/625; H04N 19/563; H04N 19/903
See application file for complete search history.

(56) References Cited

U.S. PATENT DOCUMENTS

| | | | |
|---|---|---|---|
| 5,596,659 A | 1/1997 | Normile et al. |
| 5,703,799 A | 12/1997 | Ohta |
| 6,016,360 A | 1/2000 | Nguyen et al. |
| 6,052,205 A | 4/2000 | Matsuura |
| 6,128,407 A | 10/2000 | Inoue et al. |
| 6,393,156 B1 | 5/2002 | Nguyen et al. |
| 6,463,178 B1 | 10/2002 | Kondo et al. |
| 6,625,221 B2 | 9/2003 | Knee et al. |
| 6,690,731 B1 | 2/2004 | Gough et al. |
| 6,697,521 B2 | 2/2004 | Islam et al. |
| 6,792,153 B1 | 9/2004 | Tsujii |
| 7,003,167 B2 | 2/2006 | Mukherjee |

(Continued)

FOREIGN PATENT DOCUMENTS

| | | |
|---|---|---|
| JP | 2003-018412 | 1/2003 |
| JP | 2004-173205 | 6/2004 |

(Continued)

*Primary Examiner* — Obafemi Sosanya
(74) *Attorney, Agent, or Firm* — DLA Piper LLP (US)

(57) ABSTRACT

A system and method for frequency reduction and restoration. The system and method may be used to reduce the visual redundancy in digital data, such as in video data and image data.

37 Claims, 4 Drawing Sheets

(56) References Cited

U.S. PATENT DOCUMENTS

| | | |
|---|---|---|
| 7,149,811 B2 | 12/2006 | Wise et al. |
| 7,791,508 B2 | 9/2010 | Wegener |
| 7,916,960 B2 | 3/2011 | Mizuno |
| 7,965,900 B2 | 6/2011 | Maurer et al. |
| 8,077,990 B2 | 12/2011 | Islam |
| 8,130,828 B2 | 3/2012 | Hsu et al. |
| 8,265,144 B2 | 9/2012 | Christoffersen et al. |
| 8,422,804 B2 | 4/2013 | Islam |
| 2001/0031009 A1 | 10/2001 | Knee et al. |
| 2001/0041011 A1 | 11/2001 | Passagio et al. |
| 2001/0048770 A1 | 12/2001 | Maeda |
| 2003/0002734 A1 | 1/2003 | Islam et al. |
| 2003/0202581 A1 | 10/2003 | Kodama |
| 2003/0206590 A1* | 11/2003 | Krishnamachari .. H04N 19/139 375/240.16 |
| 2004/0264793 A1 | 12/2004 | Okubo |
| 2005/0063599 A1 | 3/2005 | Sato |
| 2006/0039473 A1* | 2/2006 | Filippini ............. H04N 19/56 375/240.16 |
| 2006/0115166 A1 | 6/2006 | Sung et al. |
| 2006/0285587 A1* | 12/2006 | Luo .................... G06T 5/009 375/240.2 |
| 2007/0019875 A1* | 1/2007 | Sung .................... H04N 19/50 382/239 |
| 2007/0206871 A1* | 9/2007 | Jalil .................. H04N 19/176 382/233 |
| 2007/0237237 A1 | 10/2007 | Chang et al. |
| 2007/0248163 A1 | 10/2007 | Zuo et al. |
| 2008/0247658 A1 | 10/2008 | Lee et al. |
| 2010/0066912 A1 | 3/2010 | Kumwilaisak et al. |
| 2010/0266008 A1 | 10/2010 | Reznik |
| 2011/0103445 A1 | 5/2011 | Jax et al. |
| 2011/0206287 A1 | 8/2011 | Islam |
| 2014/0188451 A1 | 7/2014 | Asahara et al. |

FOREIGN PATENT DOCUMENTS

| | | |
|---|---|---|
| JP | 2007-104645 | 4/2007 |
| JP | 2007-318711 | 12/2007 |
| KR | 2003-0007080 | 1/2003 |
| KR | 10-2004-0106480 | 12/2004 |
| KR | 10-2007-0090185 | 9/2007 |
| KR | 10-2008-0090936 | 10/2008 |
| KR | 2010-0918377 | 9/2009 |
| WO | WO 2006/061734 | 6/2006 |

* cited by examiner

FREQUENCY REDUCTION AND RESTORATION SYSTEM AND METHOD IN VIDEO AND IMAGE COMPRESSION

PRIORITY CLAIM

This application claims the benefit under 35 USC 119(e) and priority under 35 USC 120 to U.S. Provisional Patent Application No. 61/825,487 filed on May 20, 2013 and titled "Frequency Reduction and Restoration System and Method in Video and Image Compression", the entirety of which is incorporated herein by reference.

FIELD

The disclosure relates generally to video and image compression.

BACKGROUND

Digital data, such as digital images, moving picture images or videos, contain a lot of information (represented by pixels) that is redundant for the human visual system. Removing this redundant information reduces the size of the digital data, such as images and videos, so that the digital data may be compressed. Thus, it is desirable to have a way in which that redundant data may be removed automatically. Furthermore, it is desirable to be able to reduce the redundancy in compressed data.

BRIEF DESCRIPTION OF THE DRAWINGS

FIG. 4 illustrates an example of a redundancy information model.

DETAILED DESCRIPTION OF ONE OR MORE EMBODIMENTS

The disclosure is particularly applicable to redundancy reduction system and method for compressed digital data, such as image data or video data, and it is in this context that the disclosure will be described. It will be appreciated, however, that the redundancy reduction system has greater utility since it may be used for other types of data that have redundancies.

Figure 1:
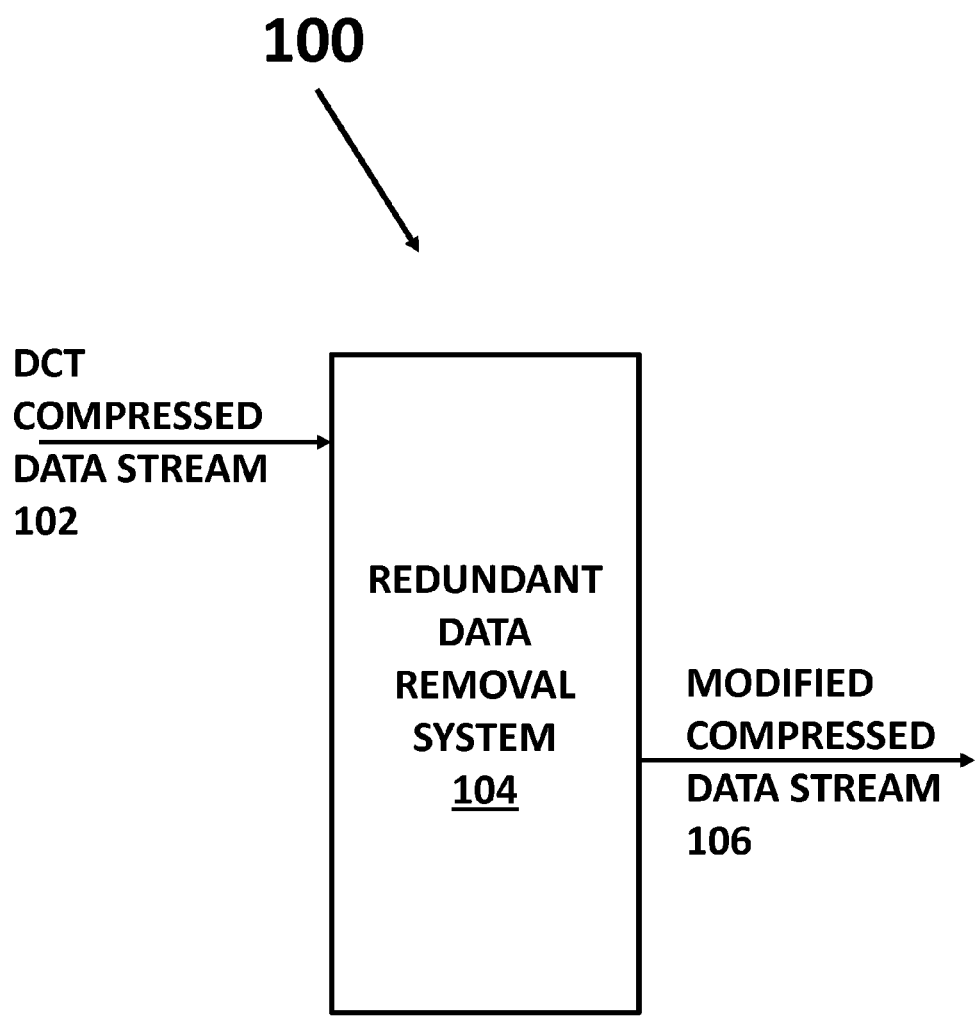
FIG. 1 illustrates an example of a redundancy reduction system for discrete cosine transform compressed data stream.

FIG. 1 illustrates an example of a redundancy reduction system 100 for discrete cosine transform compressed data stream, such as compressed image data or compressed video data. An input data stream 102 may be a compressed data stream that is compressed using Discrete Cosine Transforms (DCT). The input data stream, for example, may a joint picture experts group (JPEG) file or data stream, a motion JPEG file/data stream or a video file/data stream that contains MPEG-2, H.264 or H.265 compressed content. In the description provided below, the different types of DCT compressed data may be referred to collectively as DCT compressed data. The input stream 102 is fed into a redundant data removal system 104 that may generate an output data stream 106 that may be a modified compressed data stream of the same type with visually redundant information removed. The redundant data removal system 104 may be implemented in hardware or software. For example, the redundant data removal system 104 may be implemented in a processor that executes a plurality of lines of instructions or microcode to implement the system or the system 104 may be implemented in a programmable hardware device, such as an FPGA. Alternatively, the system may be implemented in a plurality of lines of computer code that may be stored in a memory (DRAM, SRAM, flash, disk drive, optical drive) that may be accessed by a processor that executed the plurality of lines of computer code. The system 104 may also be implemented in a plurality of lines of computer code stored on a computer readable medium wherein the computer readable medium may be a compact disk, flash memory or other form a readable media, but may also be stored in a remote computer system (such as one or more server computers or one or more computing resources) and then downloaded and/or accessed by a user over a network. In addition, the redundant data removal system 104 may be incorporated into another system/product.

Figure 2:
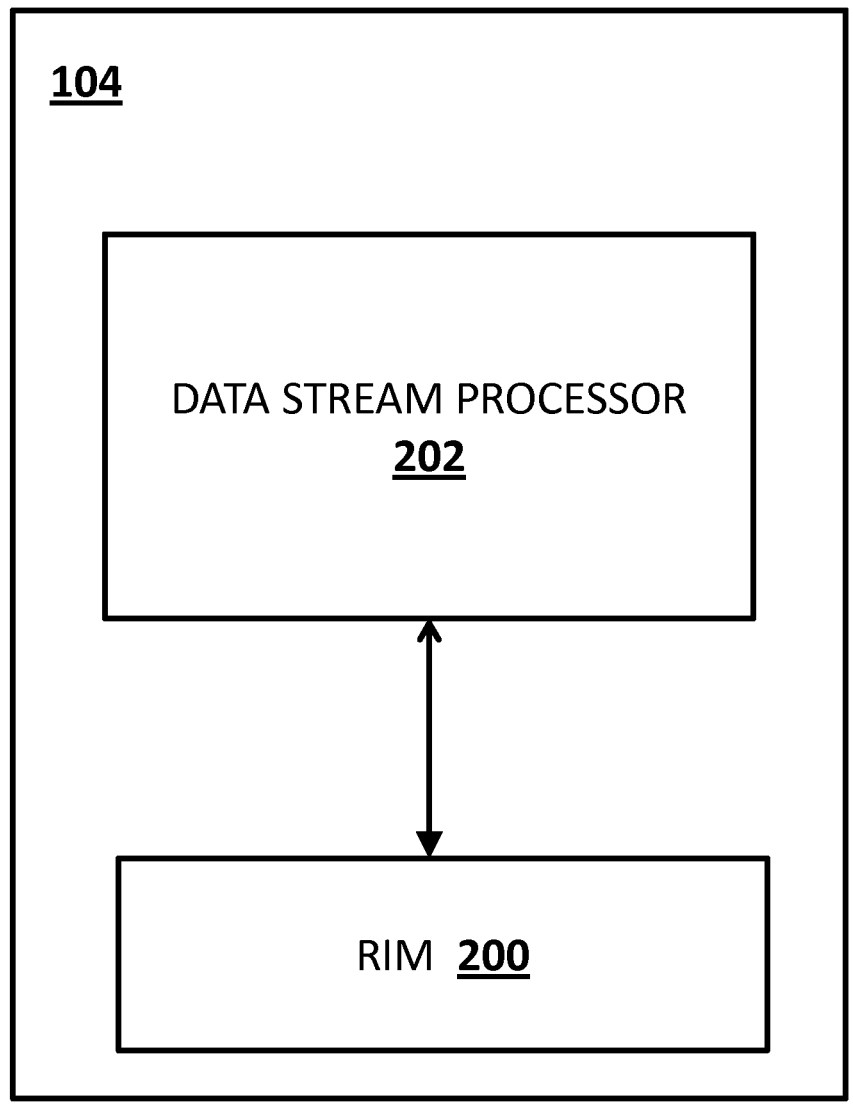
FIG. 2 illustrates more details of the redundancy reduction system of FIG. 1.
Figure 4:
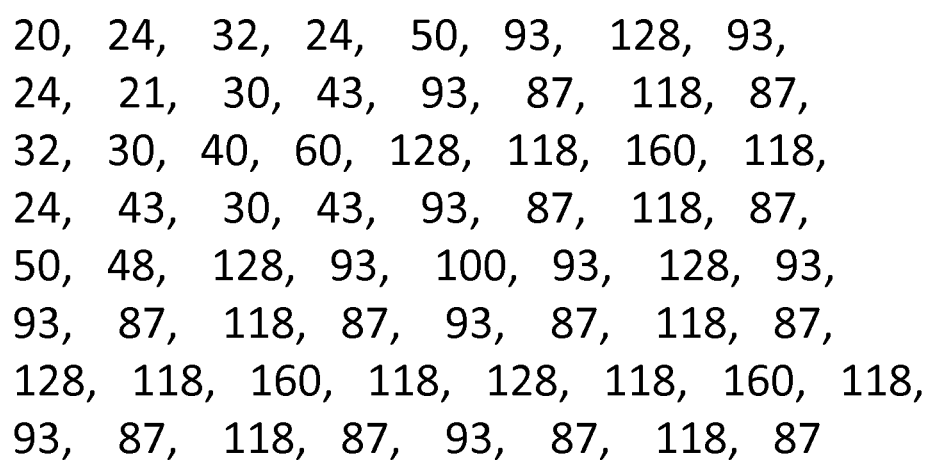

FIG. 2 illustrates more details of the redundancy reduction system 104 of FIG. 1. The redundancy reduction system 104 may further comprise a redundant information model 200 that is coupled to a data stream processor 202 that performs the redundancy reduction processes as described below in more detail. In one embodiment, prior to actually processing the compressed data stream, the Redundant Information Model (RIM) may be constructed by empirically analyzing a range of data streams. Typically, the redundant Information Model may contain numerical values that correspond to each of the frequencies used in the DCT. For example, an 8×8 DCT based data stream will have 64 frequencies for which the RIM is constructed. One example of a RIM model for a low-detail DCT block (a block of DCT coefficients for a block of pixels with a low amount of content/visual information) is shown in FIG. 4 in which the positions in the matrix correspond to specific frequencies in the DCT block, and the values correspond to the amount of redundancy in that frequency. In the system implementation, the numerical values stored in the RIM may be subtracted from a given 8×8 DCT block, the resulting image is visually indistinguishable from the image in the incoming data stream. The RIM may have many different sets of values, each applicable under different circumstances as described in detail below.

Figure 3:
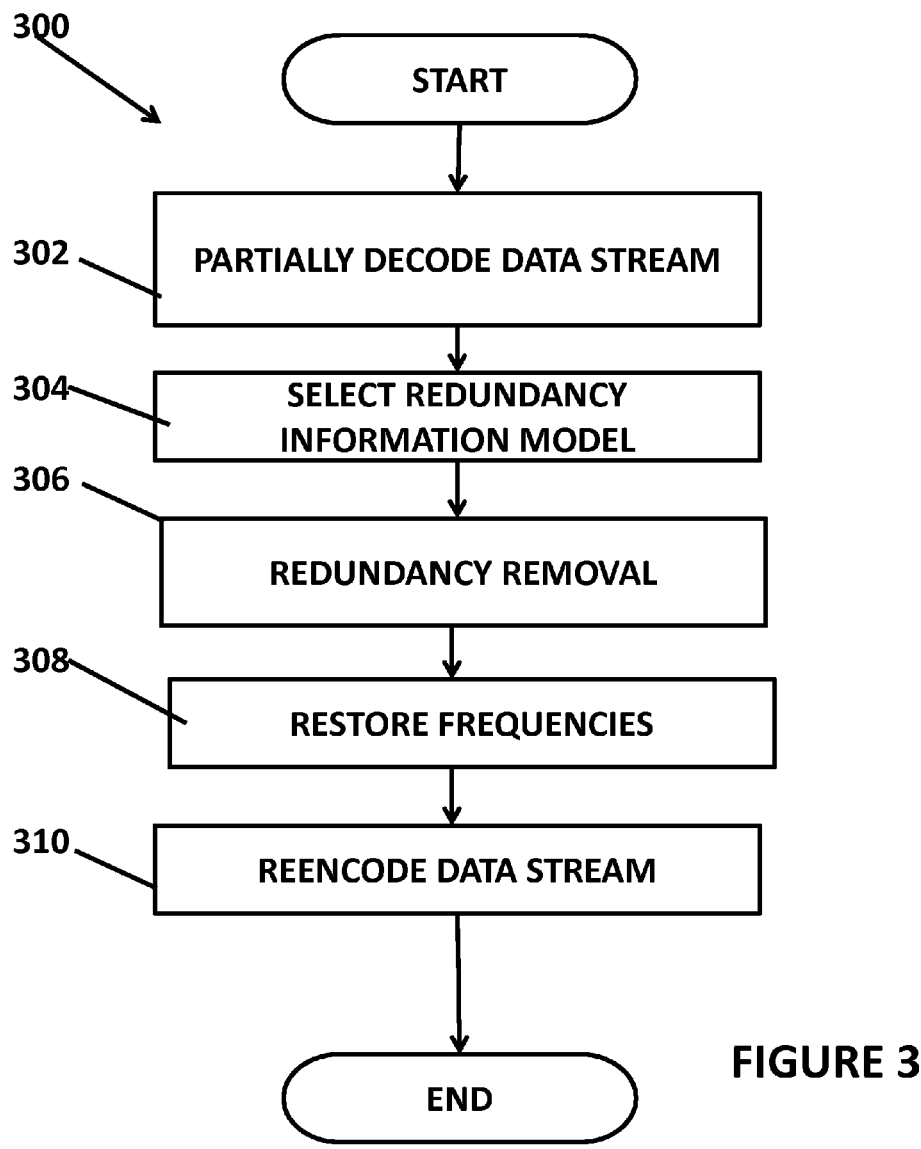
FIG. 3 is a flowchart of a redundancy removal method.

FIG. 3 is a flowchart of a redundancy removal method 300 that may be carried out by the system shown in FIGS. 1-2. In one embodiment, the processes of the method may be carried out by the data stream processor 202 in which the processes are implemented by a plurality of lines of computer code. Alternatively, the processes may be implemented by a hardware circuit, such as a processor, FPGA, etc., that executes those processes. In the method, a partial decode (302) of the incoming data stream is performed in which the incoming compressed data stream is decoded up to the point where the DCT coefficients are available for processing in Block form (for example, 4×4 block, 8×8 block etc.) In the system and method, the block may be a square which each side of the square is an integer power of 2 (e.g., 2×2 block, 4×4 block, 8×8 block, 16×16 block, 32×32 block, etc.)

Once the incoming data stream is partially decoded, the method selects a most applicable RIM for the each DCT block in the partially decoded data stream (304) as described below in more detail. For example, if the incoming DCT block has a relatively flat visual characteristic (so called "low gradience"), a specific RIM will be picked for it such as the example of the RIM in FIG. 4. Once the RIM for each DCT block is selected, the RIM data is removed from the DCT block (306). In one embodiment, if the absolute value in each DCT block in the incoming data stream is smaller than the absolute value in the RIM, the DCT coefficient in the output data stream (that corresponds to the particular DCT block) is set to 0. In the one embodiment, if the absolute value in each DCT block in the incoming data stream is not smaller than the absolute value in the RIM, the absolute value of the DCT coefficient in the incoming data stream is reduced to corresponding value in the RIM, while maintaining the sign of the DCT coefficient in the original data stream.

Once the redundancy is removed, the method restores the frequency (308.) Specifically, for coefficients whose redundancy removal above has introduced unacceptable visual difference in the block (using, for example, the method described below), the method restores those coefficients in the DCT block back to their original values from the DCT. Once the restoring of the frequency has been completed, the data stream is re-encoded (310) with the DCT coefficients from the method (including possibly some original coefficients as well as some coefficients from the RIM.)

Selecting the Most Applicable RIM

The appropriate RIM for each block may be picked using one or more of the following criteria that may be assessed, for example, by the data stream processor 202 shown in FIG. 2. The criteria used to determine the appropriate RIM may include:

1. Size of the DCT block.
2. Statistical properties of the DCT block. (AC Energy, variance, etc.)
3. Statistical properties of the fully decoded pixels represented by the DCT block. (average value of pixels, variance of the pixels).
4. Other properties of the data stream (such as whether it is a Standard Definition or a High Definition image).

For example, if the incoming DCT block indicates a very high AC energy but is low on luminance, a collection of transforms (collectively called a transform model, which will include RIM subtraction, re-quantization as well as non-linear modification) will be selected that is more aggressive in what is subtracted from the block. In other cases, a transform model that makes minimal changes might be selected. Moreover, for an HD stream, a typical transform model will have different values for the higher frequency components because of different expected behavior in the human eye than a SD stream. When it is known that a SD stream is going to be displayed on a High Definition device, the transform model will anticipate the scaling-up of the image and be less aggressive on the mid-range and high frequencies.

One or more different RIMs may be constructed for various combinations of these criteria. The appropriate criteria are computed when a DCT block is processed (after partial decoding) and the combination of the criteria above in the particular block points to the RIM that needs to be selected for the particular block. One example of this process is, for example, when a DCT block with low variance and low gradience (see below, where 'low' means less than certain pre-determined thresholds) is processed. In this instance, the RIM that was constructed for this type of an instance is used. RIM's can vary depending upon whether the streams are Standard Definition or High Definition.

Frequency Restoration Criteria

The human eye is very sensitive to certain types of compression artifacts (such as blockiness and contouring). For certain types of DCT blocks, the selected RIM may cause a worsening of those compression artifacts. For example, image blocks that have slowly changing gradients may be particularly susceptible to an immediate worsening of compression artifacts.

The identification of these types of DCT blocks may be accomplished by computing a variance of the first derivative of the pixels represented by the DCT block and may be known as 'Gradience.' The gradience may be calculated, for example, by computing the variance of the values derived by subtracting the value of pixel from its left neighbor and top neighbors respectively.

When the gradience is less than a certain threshold (which is treated as a parameter to the system and method), the DCT block is selected for Frequency Restoration. The gradience of the block may range from 0 to 255 and may be clipped to 255 if the gradience value is greater than 255. Actual gradience thresholds are also determined empirically and are application dependent. The actual gradience thresholds are also determined empirically and are application dependent and may be typically between 0 and 12. Depending upon the specific value of the Gradience, and the size of the DCT block, one or more frequencies in the DCT block are restored to their original incoming values. For example, applications requiring a high amount of visual fidelity will use very low values of gradience, and applications requiring lower visual fidelity will allow for higher values of gradience. In low gradience DCT blocks, for example, the frequencies in the lower range are restored if the visual impact of the RIM is unacceptable. Visual impact is assessed usually be determining if the frequency in that range has been set to 0, but any other reasonable metric can also be used.

While the foregoing has been with reference to a particular embodiment of the invention, it will be appreciated by those skilled in the art that changes in this embodiment may be made without departing from the principles and spirit of the disclosure, the scope of which is defined by the appended claims.

The invention claimed is:

1. A system for reducing redundancy in a compressed data stream, comprising:
   a data stream processor; and
   the data stream processor configured to partially decode a compressed incoming data stream into a plurality of blocks in which each block has a plurality of coefficients and each coefficient has a value, configured to select a redundancy model for each block, the selected redundancy model having a plurality of values wherein each value corresponds to a coefficient in the block, configured to remove redundancies in the partially decoded incoming data stream based on the selected redundancy model by modifying the value of one or more of the coefficients in each block based on the one or more values in the selected redundancy model that correspond to the one or more coefficients in each block and configured to encode a data stream with the plurality of blocks that contain the modified coefficient values.

2. The system of claim 1, wherein the data stream processor is configured to restore the value to the partially decoded incoming data stream by changing a coefficient having a modified value back to its original value.

3. The system of claim 1, wherein the compressed incoming data stream is a DCT based compressed stream.

4. The system of claim 3, wherein the DCT based compressed stream is one of an MPEG-2 data stream, a H.264 data stream, a JPEG data stream, a motion JPEG data stream and a H.265 data stream.

5. The system of claim 1 further comprising a store that is configured to store a plurality of redundancy models from which the redundancy model is selected.

6. The system of claim 1, wherein the redundancy model has a plurality of values wherein each value in the redundancy model corresponds to a value in the block.

7. The system of claim 6, wherein the block is a square matrix and each side of the square matrix is an integer power of 2.

8. The system of claim 1, wherein the data stream processor is configured to select the redundancy model for each block based in part of a gradience of the block in the partially decoded incoming data stream.

9. The system of claim 1, wherein the data stream processor is configured to select the redundancy model for each block based on one or more of a size of the block, a statistical property of the block and a property of the block.

10. The system of claim 1, wherein the data stream processor is one of a processor and a programmable hardware device.

11. A method of reducing redundancy in a compressed data stream, comprising:
partially decoding an incoming data stream into a plurality of blocks in which each block has a plurality of coefficients and each coefficient has a value;
selecting a redundancy model for each block, the selected redundancy model having a plurality of values wherein each value corresponds to a coefficient in the block;
removing redundancies in the partially decoded incoming data stream based on the selected redundancy model by modifying the value of one or more of the coefficients in each block based on the one or more values in the selected redundancy model that correspond to the one or more coefficients in each block; and
encoding a data stream with the plurality of blocks and the modified coefficient values.

12. The method of claim 11 further comprising restoring the value to the partially decoded incoming data stream by changing a coefficient having a modified value back to its original value.

13. The method of claim 11, wherein the compressed incoming data stream is a DCT based compressed stream.

14. The method of claim 13, wherein the DCT based compressed stream is one of an MPEG-2 data stream, a H.264 data stream, a JPEG data stream, a motion JPEG data stream and a H.265 data stream.

15. The method of claim 11 further comprising storing a plurality of redundancy models from which the redundancy model is selected.

16. The method of claim 11, wherein the redundancy model has a plurality of values wherein each value in the redundancy model corresponds to a value in the block.

17. The method of claim 16, wherein the block is a square matrix and each side of the square matrix is an integer power of 2.

18. The method of claim 11, wherein selecting the redundancy model further comprises selecting the redundancy model for each block based in part of a gradience of the block in the partially decoded incoming data stream.

19. The method of claim 11, wherein selecting the redundancy model further comprises selecting the redundancy model for each block based one or more of a size of the block, a statistical property of the block and a property of the block.

20. The method of claim 11 further comprising comparing, for each value in the block of the partially decoded incoming data stream, an absolute value of a value in the redundancy model that corresponds to the value in the block to an absolute value of the value in the block and setting the value in the partially decoded incoming data stream to zero if the absolute value of the value in the block is smaller than the absolute value of a value in the redundancy model that corresponds to the value in the block.

21. The method of claim 11 further comprising comparing, for each value in the block of the partially decoded incoming data stream, an absolute value of a value in the redundancy model that corresponds to the value in the block to an absolute value of the value in the block and setting the value in the partially decoded incoming data stream to the value in the redundancy model and maintaining a sign of the value in the partially decoded incoming data stream if the absolute value of the value in the block is not smaller than the absolute value of a value in the redundancy model that corresponds to the value in the block.

22. A computer readable medium, comprising:
instruction that partially decode an incoming data stream into a plurality of blocks in which each block has a plurality of coefficients and each coefficient has a value;
instructions that select a redundancy model for each block, the selected redundancy model having a plurality of values wherein each value corresponds to a coefficient in the block;
instructions that remove redundancies in the partially decoded incoming data stream based on the selected redundancy model by modifying the value of one or more of the coefficients in each block based on the one or more values in the selected redundancy model that correspond to the one or more coefficients in each block; and
instructions that encode a data stream with the plurality of blocks and the modified coefficient values.

23. The medium of claim 22 further comprising instructions that restore the value to the partially decoded incoming data stream by changing a coefficient having a modified value back to its original value.

24. The medium of claim 22 further comprising instructions that store a plurality of redundancy models from which the redundancy model is selected.

25. The medium of claim 22 further comprising instructions that select the redundancy model for each block based in part of a gradience of the block in the partially decoded incoming data stream.

26. The medium of claim 22 further comprising instructions that select the redundancy model for each block based one or more of a size of the block, a statistical property of the block and a property of the block.

27. The medium of claim 22 further comprising instructions that compare, for each value in the block of the partially decoded incoming data stream, an absolute value of a value in the redundancy model that corresponds to the value in the block to an absolute value of the value in the block and instructions that set the value in the partially decoded incoming data stream to zero if the absolute value of the value in the block is smaller than the absolute value of a value in the redundancy model that corresponds to the value in the block.

28. The medium of claim 22 further comprising instructions that compare, for each value in the block of the partially decoded incoming data stream, an absolute value of a value in the redundancy model that corresponds to the value in the block to an absolute value of the value in the block and instructions that set the value in the partially decoded incoming data stream to the value in the redundancy model and maintaining a sign of the value in the partially decoded incoming data stream if the absolute value of the value in the block is not smaller than the absolute value of a value in the redundancy model that corresponds to the value in the block.

29. The system of claim 1, wherein the data stream processor is configured to remove redundancies by comparing the value in the redundancy model to the corresponding coefficient value in the block.

30. The system of claim 29, wherein the data stream processor is configured to remove redundancies by setting a value of a coefficient in the block to zero if the value of the coefficient is smaller than the corresponding value in the redundancy model.

31. The system of claim 29, wherein the data stream processor is configured to remove redundancies by setting a value of a coefficient in the block to the corresponding value in the redundancy model if the value of the coefficient is not smaller that the corresponding value in the redundancy model.

32. The method of claim 11, wherein removing redundancies further comprises comparing the value in the redundancy model to the corresponding coefficient value in the block.

33. The method of claim 32, wherein removing redundancies further comprises setting a value of a coefficient in the block to zero if the value of the coefficient is smaller than the corresponding value in the redundancy model.

34. The method of claim 32, wherein removing redundancies further comprises setting a value of a coefficient in the block to the corresponding value in the redundancy model if the value of the coefficient is not smaller that the corresponding value in the redundancy model.

35. The computer readable medium of claim 22, wherein the instructions that remove redundancies further comprise instructions that compare the value in the redundancy model to the corresponding coefficient value in the block.

36. The computer readable medium of claim 35, wherein the instructions that remove redundancies further comprise instructions set a value of a coefficient in the block to zero if the value of the coefficient is smaller than the corresponding value in the redundancy model.

37. The computer readable medium of claim 35, wherein the instructions that remove redundancies further comprise instructions set a value of a coefficient in the block to the corresponding value in the redundancy model if the value of the coefficient is not smaller that the corresponding value in the redundancy model.

\* \* \* \* \*